(12) United States Patent
Benyamin et al.

(10) Patent No.: US 7,599,610 B2
(45) Date of Patent: Oct. 6, 2009

(54) INTERFACE FOR AUDIO VISUAL DEVICE

(75) Inventors: Daniel Benyamin, Oakland, CA (US); Vincent R. Busam, Los Angeles, CA (US); David C. Jedynak, Los Angeles, CA (US); Joseph R. Rocks, Glendale, CA (US)

(73) Assignee: Harman International Industries, Incorporated, Northridge, CA (US)

( * ) Notice: Subject to any disclaimer, the term of this patent is extended or adjusted under 35 U.S.C. 154(b) by 1763 days.

(21) Appl. No.: 10/077,562

(22) Filed: Feb. 15, 2002

(65) Prior Publication Data

US 2003/0086699 A1    May 8, 2003

Related U.S. Application Data

(60) Provisional application No. 60/335,634, filed on Oct. 25, 2001.

(51) Int. Cl.
 G11B 21/08    (2006.01)
 H04N 5/00    (2006.01)

(52) U.S. Cl. .................. 386/126; 386/46; 369/30.08

(58) Field of Classification Search .............. 386/45, 386/68–70, 75, 82, 124–126; 369/30.01–30.08, 369/30.1, 30.2
See application file for complete search history.

(56) References Cited

U.S. PATENT DOCUMENTS 4,833,554 A    5/1989    Dalziel et al.
4,982,303 A    1/1991    Krenz
5,157,643 A    10/1992   Suzuki
5,173,888 A    12/1992   An
5,253,133 A    10/1993   Guo (Continued)

FOREIGN PATENT DOCUMENTS

EP    0950570 A2    10/1999

(Continued)

OTHER PUBLICATIONS

Clarion AutoPC 310C Owner's Manual, Clarion Co., Ltd. 1998.

(Continued)

*Primary Examiner*—Thai Tran
*Assistant Examiner*—Mishawn Dunn
(74) *Attorney, Agent, or Firm*—Brinks Hofer Gilson & Lione

(57) ABSTRACT

A system is disclosed that provides access to a large amount of content using a traditional interface. The system has many applications, one of which is for providing access to audio/visual content. Examples of audio/visual content includes compressed digital music data and video data. In one embodiment, the system receives an indication of a first mode, accesses a first playlist for the first mode, and plays tracks according to the first playlist. In this embodiment, each mode is associated with a different attribute, each mode includes one or more playlists of tracks, and each playlist of a particular mode is based on a different value for the attribute associated with the particular mode. Examples of attributes include artist, album, genre, etc. Thus, there can be an artist mode, an album node, a genre mode, etc. For example, each playlist in the artist mode is associated with a particular artist. All tracks on a given playlist in the artist mode would be associated with the same artists.

56 Claims, 8 Drawing Sheets

U.S. PATENT DOCUMENTS

| | | | |
|---|---|---|---|
| 5,319,519 A | 6/1994 | Sheppard et al. |
| 5,390,027 A | 2/1995 | Henmi et al. |
| 5,408,449 A | 4/1995 | Oh |
| 5,454,080 A | 9/1995 | Fasig et al. |
| 5,541,738 A | 7/1996 | Mankovitz |
| 5,557,541 A | 9/1996 | Schulhof et al. |
| 5,612,927 A | 3/1997 | Morrison et al. |
| 5,620,244 A | 4/1997 | Yang |
| 5,726,373 A | 3/1998 | Choi et al. |
| 5,734,119 A | 3/1998 | France et al. |
| 5,794,164 A | 8/1998 | Beckert et al. |
| 5,816,861 A | 10/1998 | Cheng |
| 5,841,424 A | 11/1998 | Kikinis |
| 5,841,979 A | 11/1998 | Schulhof et al. |
| 5,860,068 A | 1/1999 | Cook |
| 5,864,868 A | 1/1999 | Contois |
| 5,865,651 A | 2/1999 | Dague et al. |
| 5,914,941 A | 6/1999 | Janky |
| 5,926,624 A | 7/1999 | Katz et al. |
| 5,963,916 A | 10/1999 | Kaplan |
| 5,969,283 A | 10/1999 | Looney et al. |
| 5,986,979 A | 11/1999 | Bickford et al. |
| 6,016,522 A | 1/2000 | Rossum |
| 6,023,290 A | 2/2000 | Seita |
| 6,038,595 A | 3/2000 | Ortony |
| 6,055,478 A | 4/2000 | Heron |
| 6,061,232 A | 5/2000 | Ho |
| 6,078,112 A | 6/2000 | Saunders et al. |
| 6,118,450 A | 9/2000 | Proehl et al. |
| 6,132,243 A | 10/2000 | Hirata et al. |
| 6,142,796 A | 11/2000 | Behl et al. |
| 6,155,853 A | 12/2000 | Kajiura |
| 6,163,817 A | 12/2000 | Shteyn et al. |
| 6,176,734 B1 | 1/2001 | Juntwait et al. |
| 6,202,008 B1 | 3/2001 | Beckert et al. |
| 6,212,555 B1 | 4/2001 | Brooks, Jr. |
| 6,233,226 B1 | 5/2001 | Gringeri et al. |
| 6,233,623 B1 | 5/2001 | Jeffords et al. |
| 6,233,682 B1 | 5/2001 | Fritsch |
| 6,236,997 B1 | 5/2001 | Bodamer et al. |
| 6,317,141 B1 | 11/2001 | Pavley et al. |
| 6,330,337 B1 | 12/2001 | Nicholson et al. |
| 6,344,801 B1 | 2/2002 | Aoki et al. |
| 6,378,010 B1 | 4/2002 | Burks |
| 6,385,596 B1 | 5/2002 | Wiser et al. |
| 6,457,640 B2 | 10/2002 | Ramachandran et al. |
| 6,487,145 B1 | 11/2002 | Berhan |
| 6,721,489 B1 | 4/2004 | Benyamin et al. |
| 6,731,312 B2 | 5/2004 | Robbin |
| 6,772,212 B1 | 8/2004 | Lau et al. |
| 6,823,225 B1 | 11/2004 | Sass |
| 6,975,612 B1 | 12/2005 | Razavi et al. |
| 7,191,190 B2 * | 3/2007 | Debique et al. ......... 707/104.1 |

FOREIGN PATENT DOCUMENTS

| | | |
|---|---|---|
| GB | 2349267 | 10/2000 |
| JP | 61-077184 | 4/1986 |
| JP | 2706583 | 10/1997 |
| JP | 11-297055 | 10/1999 |
| JP | 2000-251460 | 9/2000 |
| JP | 2000-285660 | 10/2000 |
| JP | 2001-057062 | 2/2001 |
| JP | 2001-126458 | 5/2001 |
| WO | WO 99/28897 A | 6/1999 |
| WO | WO 00/60918 A | 10/2000 |
| WO | WO 01/67266 | 9/2001 |
| WO | WO 01/67758 | 9/2001 |

OTHER PUBLICATIONS

Excerpts from www.empeg.com, 1999.
RCA LYRA User's Guide, RD2201/2202/2204, 1999.
International Search Report for PCT/US01/06602, Jul. 3, 2001.
International Search Report for PCT/US02/33488, Jan. 23, 2003.
The prosecution history of U.S. Appl. No. 09/521,182 shown in the attached Patent Application Retrieval file wrapper document list, printed Dec. 22, 2008, including each substantive office action and applicant response, if any.
The prosecution history of U.S. Appl. No. 10/881,549 shown in the attached Patent Application Retrieval file wrapper document list, printed Dec. 22, 2008, including each substantive office action and applicant response, if any.
Supplementary European search report for EP 02784180.8, dated Apr. 17, 2009.

* cited by examiner

INTERFACE FOR AUDIO VISUAL DEVICE

This application claims the benefit of U.S. Provisional Application No. 60/335,634, "User Interface for Audio Device," filed on Oct. 25, 2001, which is incorporated herein by reference.

BACKGROUND OF THE INVENTION

1. Field of the Invention

The present invention is directed to an interface for an audio/visual system.

2. Description of the Related Art

The automobile audio industry is a growing and successful industry. Most automobiles sold include some type of audio system. For example, many automobiles include a radio, a cassette player and/or a compact disc player. Some automobile audio systems include a disc changer. A disc changer is a device that can hold more than one audio disc and can be used to play songs from any of the discs being stored in the disc changer. Typical disc changers are separate components of a stereo system and can hold six, eight or ten discs such that the disks can be inserted in and removed from the disc changer separately. Examples of disc changers include audio compact disc changers, audio minidisk changers and CD-ROM disc changers.

Part of the reason that automobile audio systems are so popular is because many people want to hear music while they are driving. While listening to a radio is sufficient for many people, a growing number of drivers prefer to pick and choose what music they will listen to. These drivers prefer audio systems that include a tape player or a compact disc player.

Although there are many audio systems with a compact disc player or tape player available to the public, these audio systems have drawbacks. First, these systems can only store a limited amount of music. That is, a system with a tape deck can only store the maximum amount of music that fits on a tape, which often is sixty minutes, or one hundred and twenty minutes. Compact discs typically hold approximately seventy-four minutes of music. Thus, these devices have a limited amount of music that can be stored. Second, if a user is listening to a first tape or compact disc and chooses to listen to a different tape or compact disc that is not already stored in the player, the user must remove the compact disc or tape and insert a different one. This can be a difficult and dangerous maneuver while driving an automobile. Third, tape decks and compact disc players require physical media. Although music can be stored on a computer's memory, prior art stereos require tapes or compact discs for each set of tracks. Thus, extra resources are wasted manufacturing and purchasing the media. Fourth, the media is vulnerable. For example, compact discs can scratch or break. Cassettes can wear out or break.

Additionally, there is a new trend to order music online. That is, consumers can purchase music over the Internet by downloading the music. As downloading music becomes more popular, consumers will want to play this downloaded music in their automobiles. An automobile stereo that includes a compact disc player to play music requires the user to purchase a compact disc recorder and burn a compact disc in order to play the downloaded music. Thus, there is a need for an improved automobile audio system that does not require cassettes or compact discs, can be used with reusable media and can play music downloaded from a computer or other device.

One solution that is available is the solid state automobile stereo, which stores music in .mp3 format (or other compressed digital music formats). Such a system can typically store very large amounts of music data. Because of the large amounts of music data stored on a solid state automobile stereo, there needs to be a way to organize the music for the user. Previous systems allow a user to make playlists. One drawback with user defined playlist is that creating the playlist takes a considerable amount of time and, if a user has many playlists, the user may have trouble remembering what tracks (e.g. songs) are on what playlists. Finally, since many automobiles already have stereos installed, it is advantageous to auto owners to be able to use their existing in-dash stereos to access data on a solid state device.

Therefore, there is a need to provide a better interface for accessing tracks in a system that can store a large amount of data.

SUMMARY OF THE INVENTION

The present invention, roughly described, pertains to a system for accessing a large amount of content in an organized manner. One embodiment of the present invention can be used to provide an interface for accessing music on a digital music device using a traditional automobile stereo interface. The music is stored as compressed digital audio data such as .mp3 format; however, other compressed formats can be used and uncompressed formats can be used. Additionally, the present invention can also be used with other audio and video content, and in systems that are auto related and non-auto related.

One embodiment of the present invention includes a system for presenting audio/visual tracks, where the tracks have track identification attributes. The system receives an indication of a first mode of a set of modes. Each mode is associated with a different track identification attribute. Each mode includes one or more playlists of tracks. These playlists can be created in advance (e.g. prior to receiving the indication of the first mode) or automatically when needed (e.g. in response to receiving the indication of the first mode). Each playlist of a particular mode is based on a different value for the track identification attribute associated with the particular mode. The system accesses a first playlist for the first mode and plays tracks according to the first playlist. The tracks can be songs, narratives, movies, shows, commercials, or any other audio/visual content.

In one embodiment, a track identification attribute is a data value that can be used to describe or identify a track, a characteristic of a track or a combination of characteristics of a track. A track identification attribute can be based on a pre-existing characteristic or can be user created. Examples of track identification attributes include title, artist, album, genre, media type, year of publication, rating, reviews, quality, etc. An example of a track identification attribute that is based on a combination of characteristics is an attribute that identifies a particular artist and a particular publication time period (e.g. Beatles 1968-1970). Another example of a track identification attribute that is based on a combination of characteristics is an attribute that identifies a particular artist and a particular genre (e.g. Billy Joel classical).

Another embodiment of the present invention includes sequentially playing a first set of tracks that have a common value for a first track identification attribute. The system receives an indication of a second track identification attribute while sequentially playing the first set of tracks. A second set of tracks is determined based on a particular value for the second track identification attribute for a particular track playing at a time when the indication of the second track identification attribute was received. The second set of tracks has the particular value for the second track identification attribute. The system then plays the second set of tracks.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

While the embodiments of the invention described below pertain to an in-vehicle audio system, the present invention can also be used in other contexts and with other types of audio/visual data. For purposes of this patent, audio/visual includes audio alone, visual alone, or a combination of audio and visual. Examples of audio data include music, speech or other sounds. Examples of visual data include video, animation, slide show, text, still images, etc. Thus, the present invention can be used to present video data, visual text data, speech data, or any other type of audio/visual data. In one embodiment, the audio/visual data is grouped into tracks. A track could be a song, a message, a story, a video, a scene from a video, etc. The term track is used, therefore, to refer to a grouping of audio/visual data.

Tracks can be grouped together by a playlist. In its most general form, a playlist is a list of tracks. The list can be ordered or not ordered. In one embodiment, the playlist stores an identification of a track and a path indicating where to find the track. In other embodiments, additional information can also be stored, less information can be stored or other information can be stored. In the prior art, playlists are typically created by a user who manually selects a set of songs to be added to the playlists. The prior art also includes means for a user to define criteria for creating playlists. These manually created playlists and playlist created according to criteria will both be referred to as user created playlists.

Figure 1:
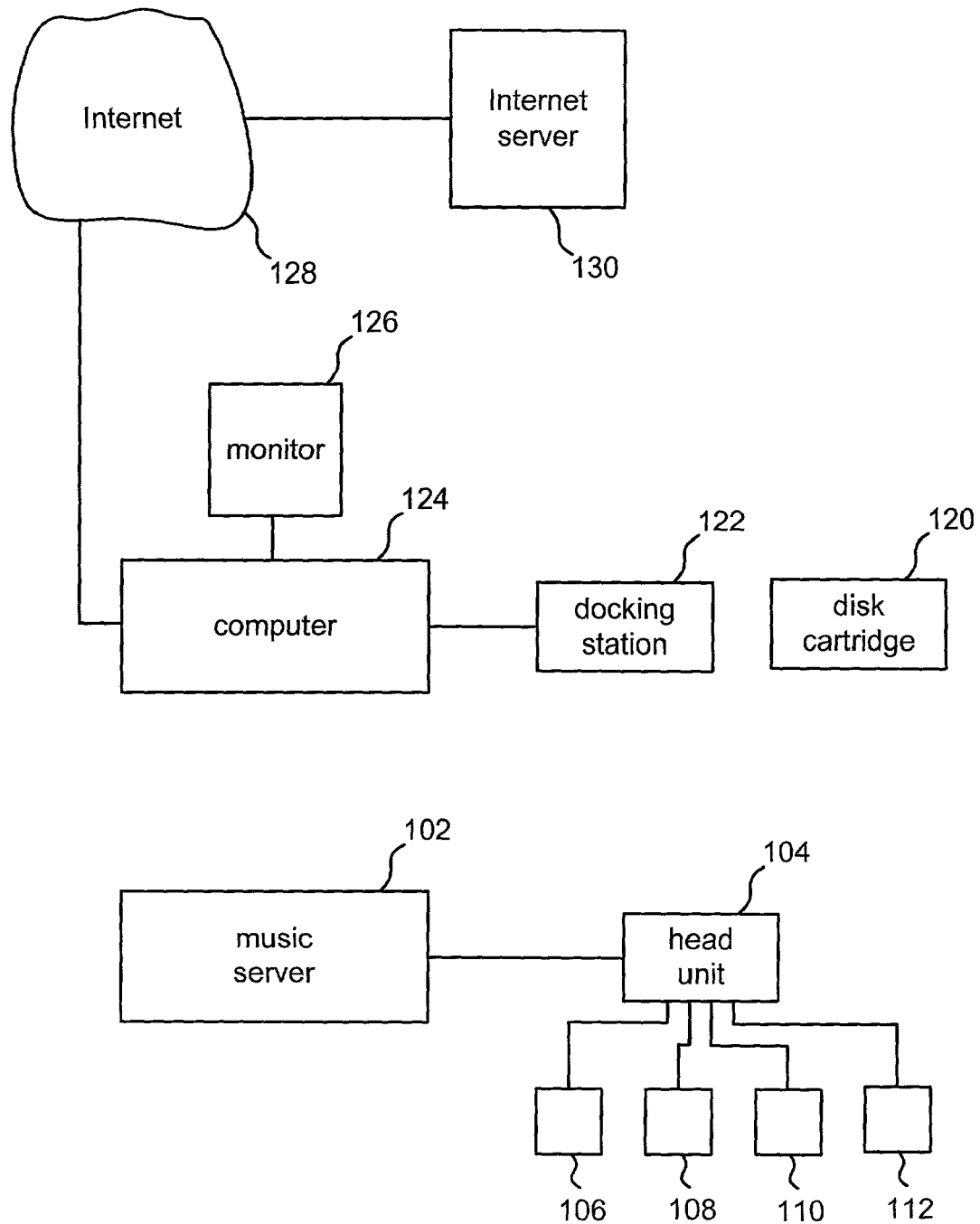
FIG. 1 is a block diagram of one embodiment of hardware that can be used for the present invention.

FIG. 1 depicts one embodiment of a system that can implement the present invention. FIG. 1 depicts music server 102, which is one embodiment of an audio/visual server. In one embodiment, music server 102 emulates a disc changer. Music server 102 is in communication with head unit 104. In one embodiment, head unit 104 is a standard automobile stereo head unit, which is adapted to communicate with a disc changer. Connected to head unit 104 are speakers 106, 108, 110 and 112 for providing music to the user. FIG. 1 also shows removable disk cartridge 120 which can be connected to music server 102 or docking station 122 (also called a dock). In one embodiment, disk cartridge 120 includes a hard drive. In other embodiments, disk cartridge 120 includes other types of storage media (e.g. flash memory, RAM, optical disc, DVD, etc.).

Docking station 122 is connected to computer 124. In one embodiment, docking station 122 connects to a USB port of computer 124. In other embodiments, docking station 122 can connect to a parallel port, serial port, fire wire connection or other interface. In other embodiments, docking station 122 communicates with computer 124 using a wireless connection, including infrared, RF, etc. Alternatively, docking station can be a separate entity on a network communicating to computer 124 over a network.

FIG. 1 shows a monitor 126 connected to computer 124. Computer 124 is a standard personal computer known in the art. For example, computer 124 includes a processor, a memory in communication with the processor, a hard disk drive in communication with the processor, a USB port, a serial port, a parallel port, a network interface (e.g. network card or modem), a keyboard and a pointing device. The keyboard, pointing device and monitor 126 are used to provide and interact with a graphical user interface (GUI) so that a user can add tracks to music server 102. Computer 124 is connected to Internet 128 via a modem, LAN or other means. In one embodiment of the present invention, an Internet server 130 is provided via the Internet for downloading tracks, downloading information about tracks, storing information about tracks and downloading firmware. In one embodiment of the system of FIG. 1, the tracks are songs.

In general, the embodiment shown in FIG. 1 operates as follows. A user will insert disk cartridge 120 into docking station 122. Using the GUI on computer 124, the user will download tracks from the Internet (including Internet server 130) or other source to the hard disk of computer 124. The downloading of music can also be done without using the GUI of the present invention. After the tracks are on disk cartridge 120, disk cartridge 120 is removed from docking station 122 and inserted into music server 102. In one embodiment, music server 102 and head unit 104 are mounted in an automobile. More specifically, music server 102 may be mounted in the trunk of a car and head unit 104 is mounted in the dashboard. After disk cartridge 120 is inserted into music server 102, a user can use head unit 104 to access tracks on disk cartridge 120 and play those tracks through speakers 106, 108, 110 and 112.

The hard disk drive in disk cartridge 120 includes music files to be played by music server 102. The hard disk drive also includes various program code, configuration information and playlist information. Examples of configuration information includes whether there should be a pause between tracks, whether text output should be enabled, whether random play should be enabled, the length of the gap between tracks, information about repeating tracks in the playlist, a series of files for configuring controller 320 to communicate with head unit 104, and a text file with a set of flags which indicate any of the following: disk cartridge change, other devices connected, head unit text on/off, time elapsed to be displayed up or down, etc. The flag indicating disk cartridge change is a one byte binary value that is incremented by computer 124 if disk cartridge 120 is connected to docking station 122 and data is written to or deleted from disk cartridge 120. Alternatively, he flag can be one bit. Note that in one embodiment, music server 102 is prohibited from writing to disk cartridge 120. The drive also includes a button mapping file which is used to override the function of any button on the head unit. A file is also included which provides a temperature setting for automatically turning the box off. In one embodiment, music server 102 includes a thermometer and electronics for determining the temperature. If the temperature reaches the setting in the file, music server 102 will automatically turn off. Another file stores the firmware used to program controller 320 to communicate with head unit 104. The firmware (and its version number) on hard disk drive 178 is encrypted.

Hard disk drive 178 also stores the operating system for music server 102. In one embodiment, the operating system used is LINUX. Other operating systems can also be used. In addition to the operating system code, drivers are stored (including the IDE driver, audio drivers for the digital to analog converter, a driver for the serial interface between the processor and the controller, etc.). A start up file is also stored (which includes start up code performed by processor 302 after receiving power).

Figure 2:
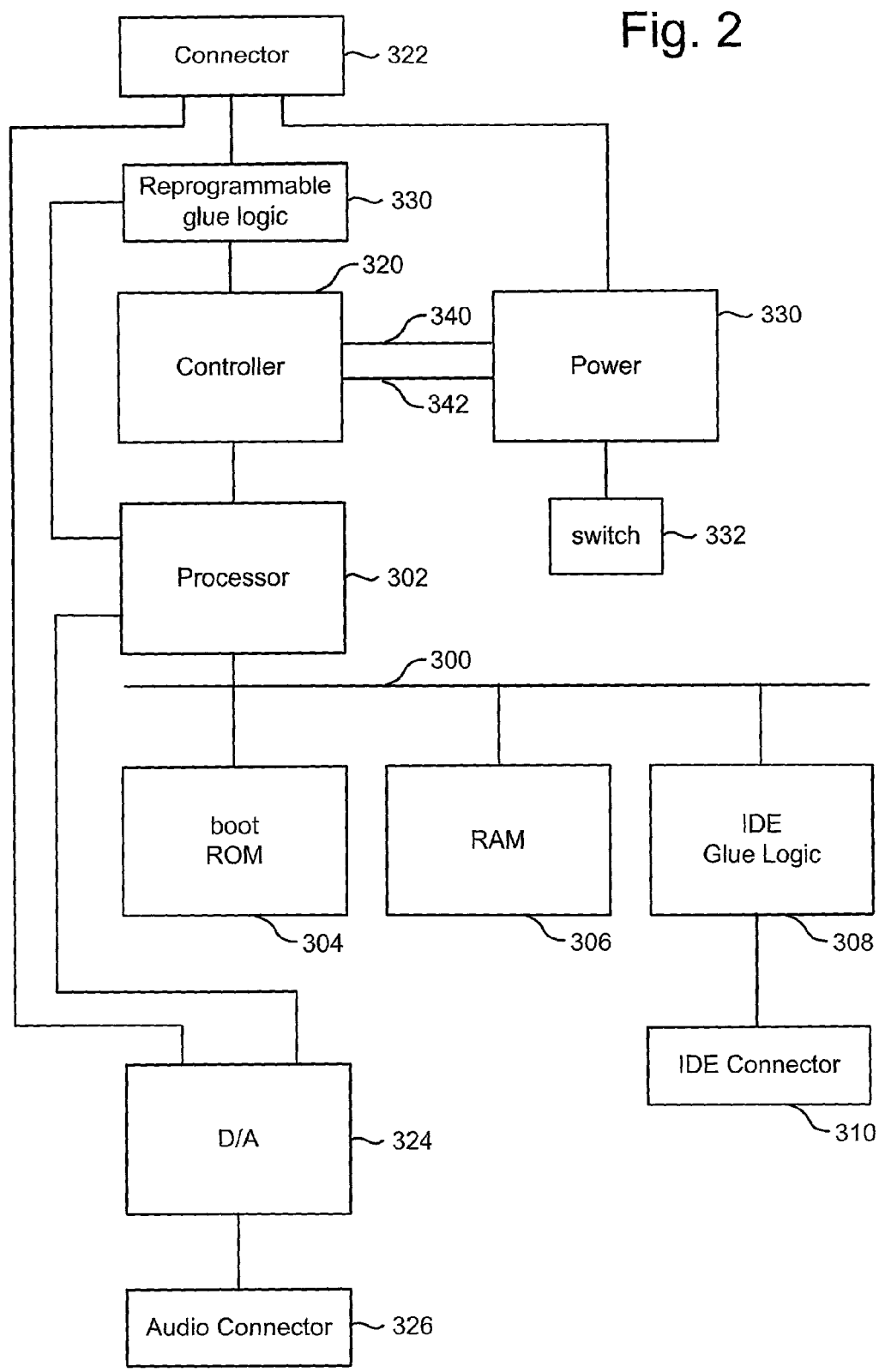
FIG. 2 is a block diagram of the components of the server of FIG. 1.

FIG. 2 shows a block diagram of the components of one embodiment of music server 102. Bus 300 is connected to processor 302, boot ROM 304, RAM 306 and IDE glue logic 308. Connected to IDE glue logic 308 is IDE connector 310. IDE connector 310 is used to connect to connector 172 of disk cartridge 120. RAM 306 is used as memory for processor 302. In one embodiment, RAM 306 includes 16 megabytes of DRAM. Boot ROM 304 is used to store the code for booting processor 302. Processor 302 is also connected to controller 320. Music server 102 uses a separate processor and controller because the communication with the head unit is in real time, while processor 302 is busy decoding audio and/or visual data. In one embodiment, processor 302 is an EP 7212 from Cirrus Logic, which implements the ARM architecture. One example of a suitable controller is the Phillips 8051 Microcontroller. Note that other processors and/or controllers can also be used. Although controller 320 is referred to as a controller, the terms controller and processor can be used interchangeably and controller 320 can be referred to as a processor.

The communication between controller 320 and processor 302 includes a serial interface. In some embodiments, there is also a program signal sent from processor 302 to controller 320. Controller 320 includes an internal flash memory. The program signal is used by processor 302 to program the internal flash memory of controller 320. Controller 320 is connected to glue logic 330, which is connected to connector 322. In one embodiment, connector 322 is a 24 pin centronics port. Connector 322 is attached to a cable. The other end of the cable connects to head unit 104. Many automobile stereo head units have a disc changer port in the back of the head unit. This port contains an interface to connect to a cable. The signals communicated by the disc changer port include a 12 volt power source, ground, an accessory signal, a clock signal and data pins. In some alternatives, the accessory signal is not part of the cable, is not sent or is sent separately.

Glue logic 330 is reprogrammable. For example, glue logic 330 can be an FPGA or a PLD (as well as other suitable reprogrammable logic devices). Glue logic 330 is connected to and programmed by processor 302. Glue logic 330 provides latches, inverters and other glue logic that is specific for each head unit and used to make communication from controller 320 compatible with the particular head unit.

Connector 322 is also connected to power module 330. The cable from head unit 104 to connector 322 provides the auto's accessory signal and a 12 volt power source from the car battery or other power source. This 12 volt power is communicated to power module 330. Power module 330 then creates a 5 volt DC power source, which is communicated to the components shown in FIG. 2. Signal 340 provides 5 volt power to controller 320. The 5 volt power connection to the other components is not shown in FIG. 2. Power module 330 also communicates a 12 volt power signal 342 to controller 320 for programming the internal flash memory of controller 320. In one embodiment, power module 330 is an LM317 from National Semiconductor. Connected to power module 330 is a switch 332. In one embodiment, switch 332 is turned on when disk cartridge 120 is properly inserted into music server 102. When switch 332 is turned on and the accessory signal is on, power module 330 sends the 5 volt power to the components of FIG. 2. When switch 332 is not turned on or the accessory signal is not turned on, power module 330 does not send the power to the components of FIG. 2. Thus, music server 102 will not operate unless disk cartridge 120 is properly inserted in music server 102. In one embodiment, one exception is that the 5 volt power signal 340 is always on. In other embodiments, the system does not include switch 332 and will operate without the insertion of disk cartridge 120. In this alternative embodiment, music can be stored in RAM 306 or another storage medium.

FIG. 2 also shows digital to analog converter 324 connected to processor 302 and connector 322. Also connected to digital to analog converter 324 is audio connector 326. In one embodiment, audio connector 326 includes one or more RCA audio ports. One or more cables connect audio connector 326 to head unit 104. In one embodiment, processor 302 is used to decode the audio/visual files. The decoded audio/visual data is communicated to digital to analog converter 324, and then on to either audio connector 326 or connector 322. Thus, server 120 can provide audio to head unit 104 via connector 322 or audio connector 326, depending on the particular head unit. The audio signal sent via connector 322 can be analog or digital, depending on the particular head unit.

The flash memory internal to controller 320 stores firmware to program controller 320 to interface with the appropriate head unit. If music server 102 is initially set up to communicate with a first head unit and the user subsequently installs music sever 102 into a different automobile with a different head unit, controller 320 can be reprogrammed to communicate with the new head unit by changing the firmware in the internal flash memory of controller 320.

Note that the connection from music server 102 to head unit 104 is described above to include a pin connector and a cable. Alternatives to a pin connector and cable combination include a cable alone, pin connector alone, wireless connection, optical connection, Ethernet, LAN, modem or another high speed or low speed data line.

Figure 3:
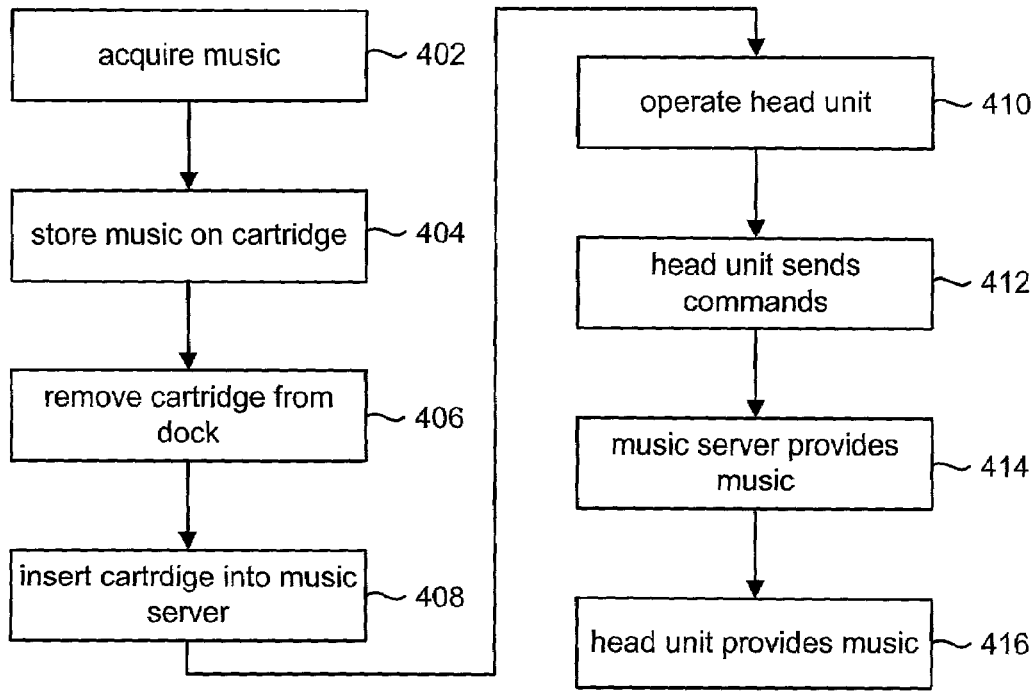
FIG. 3 is a flow chart describing the operation of the system of FIG. 1.

FIG. 3 is a flow chart describing the overall use of the embodiment of the present invention described above. In step 402, a user acquires music. There are many suitable alternatives for acquiring music. In one embodiment, music is acquired by transferring it from a floppy disk, CD-ROM, audio compact disc, etc. to computer 124. Alternatively, music could be downloaded from the Internet. Music can also be stored on computer 124 by transferring it across a network, or any other means known for transferring music or other audio/visual files. In step 404, the music desired to be played using music server 102 is transferred from computer 124 to disk cartridge 120 via docking station 122. In step 406, disk cartridge 120 is removed from docking station 122. In step 408, disk cartridge 120 is inserted into music server 102. In step 410, head unit 104 is operated by a user. In step 412, head unit 104 sends commands to music server 102 requesting certain music to be played. In step 414, music server 102 provides the requested music to head unit 104. In step 416, head unit 104 provides the music through speakers 106, 108, 110 and 112.

The embodiments of FIGS. 1-3 provide examples of systems that can be used to implement the current invention. More details of these systems can be found in U.S. patent application Ser. No. 09/521,182, titled "Audio/Visual Server," filed on Mar. 8, 2000; and PCT Application No. PCT/US01/06602, titled "Audio/Visual Server," International Filing Date of Mar. 1, 2001; both of which are incorporated herein by reference. Note that the embodiments of FIGS. 1-3 are examples of suitable systems for use with the current invention and many other systems can also be used. Furthermore, many of the implementation details of how various components of FIG. 2 communicate with each other are not relevant to the present invention.

Figure 4:
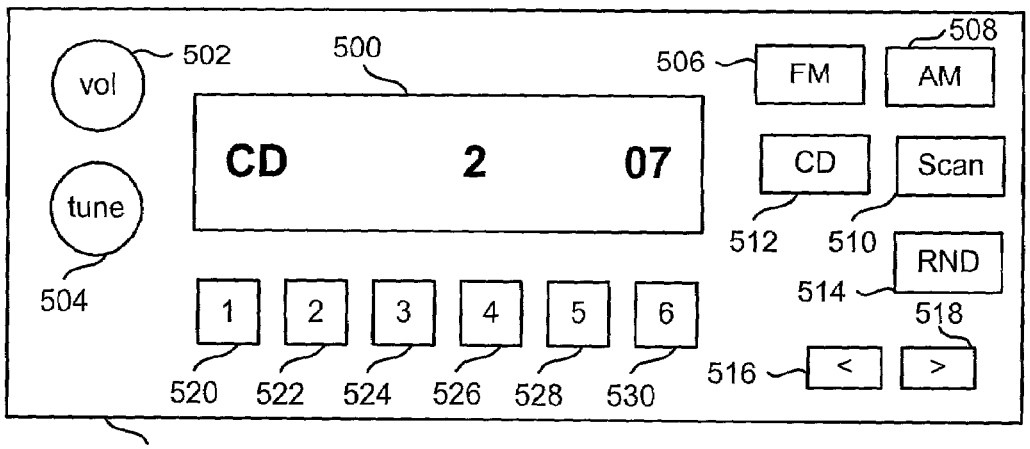
FIG. 4 depicts a user interface.

FIG. 4 shows a front view of an exemplar user interface for automobile stereo head unit 104. The user interface provides a means for the user to control the stereo system and receive information back from the stereo system. Although the interface of FIG. 4 is for an automobile stereo, the interface can be used for other types of audio/visual devices. The interface includes a display 500. When automobile head unit 104 is operating the radio, display 500 will indicate the radio station currently being tuned. When automobile head unit 104 is controlling a CD changer, "CD" will appear on the left-hand side of display 500, the disc number will appear on display 500 (e.g. 2) and the track number (e.g. 07) will be displayed on display 500. In some embodiments, head unit 104 will also include an in-dash CD player. Head unit 104 includes a volume button 502 and a tuning button 504. Head unit 104 also includes source buttons 506, 508 and 512. FM button 506 causes head unit 104 to tune FM stations. AM button 508 causes head unit 104 to tune AM stations. CD button 512 causes head unit 104 to activate the disk changer. Scan button 510, pressed during FM or AM tuning, will cause the head unit to scan various radio stations. If RND button 514 is pressed while operating the disc changer, the tracks of the disc changer will be played in a random order. Reverse button 516 is used to cause the disc changer to sequence back to the previous track. If reverse button 516 is pressed and held, the disc changer will scan a track backwards. Forward button 518, when depressed, will cause the disc changer to move to the next track. If forward button 518 is pressed and held, the disc changer will fast forward through the track. Head unit 104 also includes six numbered buttons 520 ("1"), 522 ("2"), 524 ("3"), 526 ("4"), 528 ("5"), and 530 ("6"). Buttons 520-530 are used to select a CD from the disc changer. That is, some disc changers can hold six discs. By selecting button 520, disc 1 will be selected; by selecting button 522, disc 2 will be selected; by selecting button 524, disc 3 will be selected; by selecting button 526, disc 4 will be selected; by selecting button 528, disc 5 will be selected; and by selecting button 530, disc 6 will be selected. In one embodiment, while operating as a radio, buttons 520-530 can be used to tune preset radio stations. In some embodiments, head unit 104 can use knobs, sliders, voice input, touch sensitive devices, etc, instead of or in addition to any one or more of the buttons. Each of the buttons, knobs, sliders, touch sensitive devices, voice input devices etc. on a user interface are known as input devices. The system can use any type of input device and any number of input devices to implement the present invention. For example, in one embodiment head unit can include one input device that receives voice commands to perform all of the functions of the present invention.

One embodiment of the present invention includes using the audio/visual server (described above) to emulate a disc changer. In that embodiment, buttons 520-530 can be used to select various user created playlists. However, requiring the user to store all tracks in six playlists may not be the optimal means for the user to manage and organize tracks. Thus, the present invention provides a new and useful means for organizing and accessing tracks on the audio/visual server (or other device). One embodiment of the present invention uses six buttons 520-530 to select between modes. In one implementation, at least six buttons are required. Other implementations can use more or less than six buttons. The present invention also makes use of forward and reverse buttons 516 and 518. In one embodiment, buttons 520-530, and buttons 516 and 518 are the minimum buttons required to perform the present invention. In other embodiments, more or less than those buttons can be used. In one implementation, the present invention is only used if there are not more than six buttons 520-530, and a button can only be registered once in a row, there is only one message associated with pressing a button and a numbered button may briefly mute the audio output. In other embodiments, other limitations may also apply.

One embodiment of the present invention uses two sets of buttons: mode buttons and action buttons. The mode buttons are the buttons numbered 1-6 on the head unit (buttons 520-530). The action buttons are the forward and reverse buttons 516 and 518. In other embodiments, other buttons can be used for the mode buttons or action buttons. One embodiment of the present invention includes six modes: track mode, playlist mode, album mode, artist mode, genre mode and special features mode. Track mode will allow a user to change the current track to another track on the current playlist. The current two-digit track number is depicted on display 500. This is the default mode. In one embodiment, all other modes will return to the default mode after a few seconds.

By depressing button 520, the system will enter track mode. Once in track mode, the system will move one track forward on the current playlist after button 518 is pushed, reverse one track on the current playlist after button 516 is depressed and randomize the current playlist after random button 514 is depressed. Reversing one track includes going to the beginning of the current song if not at the beginning of the current song. If already at the beginning of the current song, then reversing one track includes playing the previous track. Thus, track mode is used to switch tracks for the current playlist being used. To switch playlists, a user would have to enter playlist mode, album mode, artist mode or genre mode.

Playlist mode allows the user to change between user created playlists. While in playlist mode, display 500 will indicate the playlist number being accessed. The system will enter playlist mode after a user presses button 522. While in playlist mode, pressing forward button 518 causes the system to access the next user created playlist, pressing button 516 causes the system to access the previous user created playlist and pressing random button 514 causes the system to turn on the random feature (e.g. random tracks and/or random playlists).

Album mode allows the user to browse the various albums of tracks on the audio/visual server. The system will sort all tracks by album, and create a list of albums. In album mode, the user will browse between the various albums, choose one particular album and play the tracks from that album. In one embodiment, the system creates a playlist for each album. Each playlist contains tracks from the same album. In album mode, the user selects the album playlist desired. The user enters album mode by selecting button 524. While in album mode, selecting button 518 causes the system to access the next album playlist, pressing button 516 causes the system to access the previous album playlist and pressing random button 514 turns on the random feature. Each album playlist is assigned a number that is displayed while that playlist is being played. Alternatively, a text message can be displayed which identifies the album.

Artist mode allows a user to browse a list of all the artists represented by the songs in the audio/visual server. In one embodiment, the audio/visual server sorts all tracks (e.g., songs) by artist, thus creating playlists according to artists. Each track on a playlist will have the same artist. The user can then select which artist to listen to, and all the tracks for that artist will be played. The user enters artist mode by pressing button 526. While in artist mode, selecting button 518 causes the system to access the next artist playlist, selecting button 516 causes the system to access the previous artist playlist and selecting button 514 turns on the random feature. In one embodiment, each artist playlist is assigned a number and the appropriate number of the artist being accessed is displayed in display 500. In another embodiment, text is used to display the artist's name.

Genre mode allows a user to browse songs by genre (e.g. rock, jazz, classical . . . ). In one embodiment, the system can sort all songs by genre and create playlists for each genre. Each song on a particular playlist will be of the same genre. That is, every song on the rock playlist will be a rock song. The user enters genre mode by pressing button 528. Once in genre mode, the user can select button 518 to go to the next genre playlist, select button 516 to go to the previous genre playlist or select button 514 to turn on the magazine random feature. While in genre mode, the system will display the particular genre being accessed on display 500. In one embodiment, each genre is assigned a number and that number is displayed in display 500. Alternatively, a text message can be displayed indicating "rock", "jazz," etc.

Special features mode allows access to several run-time features and configuration features, as well as providing for future addition of features. In one embodiment, the special features menu is limited to only one level of depth. In other embodiments, multiple levels can be used. The user enters special features mode by selecting button 530. Once in special features mode, the user can switch between various menu items using reverse button 516 and forward button 518. Scan button 510 is used to select an item. In one embodiment, the special features menu includes six items. The first item is a quick help menu. The second item turns on the voice messages to help a user. The third item turns off voice messages. The fourth item causes all voice messages to be in English. The fifth item causes the help messages to be in a language other than English (e.g. German). The sixth item plays version release info from an audio file.

As discussed above, head unit 104 communicates with audio/visual server 102 by sending messages, which are received by controller 320. Controller 320 communicates with processor 302. Some of the messages sent between controller 320 and processor 302 include controller 320 informing processor 302 of the current mode requested and actions selected. Additionally, messages can be sent from controller 320 to processor 302 indicating to start or stop playing various tracks. For example, when entering feature mode, controller 320 will send a message to processor 302 indicating that the controller has entered into feature menu. Processor 302 will respond with information for the current menu of features. Controller 320 will also indicate to processor 302 what menu item is shown in the display. Processor 302 may play an audio file, reply with a text packet or do nothing. Controller 320 will also indicate to processor 302 whether to descend up or down a set of menu items, menu levels or tracks.

Note that the above discussion describes custom user playlists, playlists organized by artist, playlists organized by album and playlists organized by genre. The present invention also supports playlists organized by other attributes of tracks; for example, by date published, band members, country of origin, alphabetical, actors, length, language or any other criteria. In one embodiment, the modes are associated with track identification attributes. A track identification attribute can be a data value that describes a track and can be used to identify a track. Examples include title, album, genre, artist, year published, country of origin, language, actor, length, or any other information that can be used to describe or identify a track. In one embodiment, the present invention is used with music files in .mp3 format. Currently, mp3 files include an ID3 tag. An ID3 tag can store the title of the track, the artist, album, year recorded, track number, genre and comments. Any of the information in the ID3 tag can be a track identification attribute.

Figure 5:
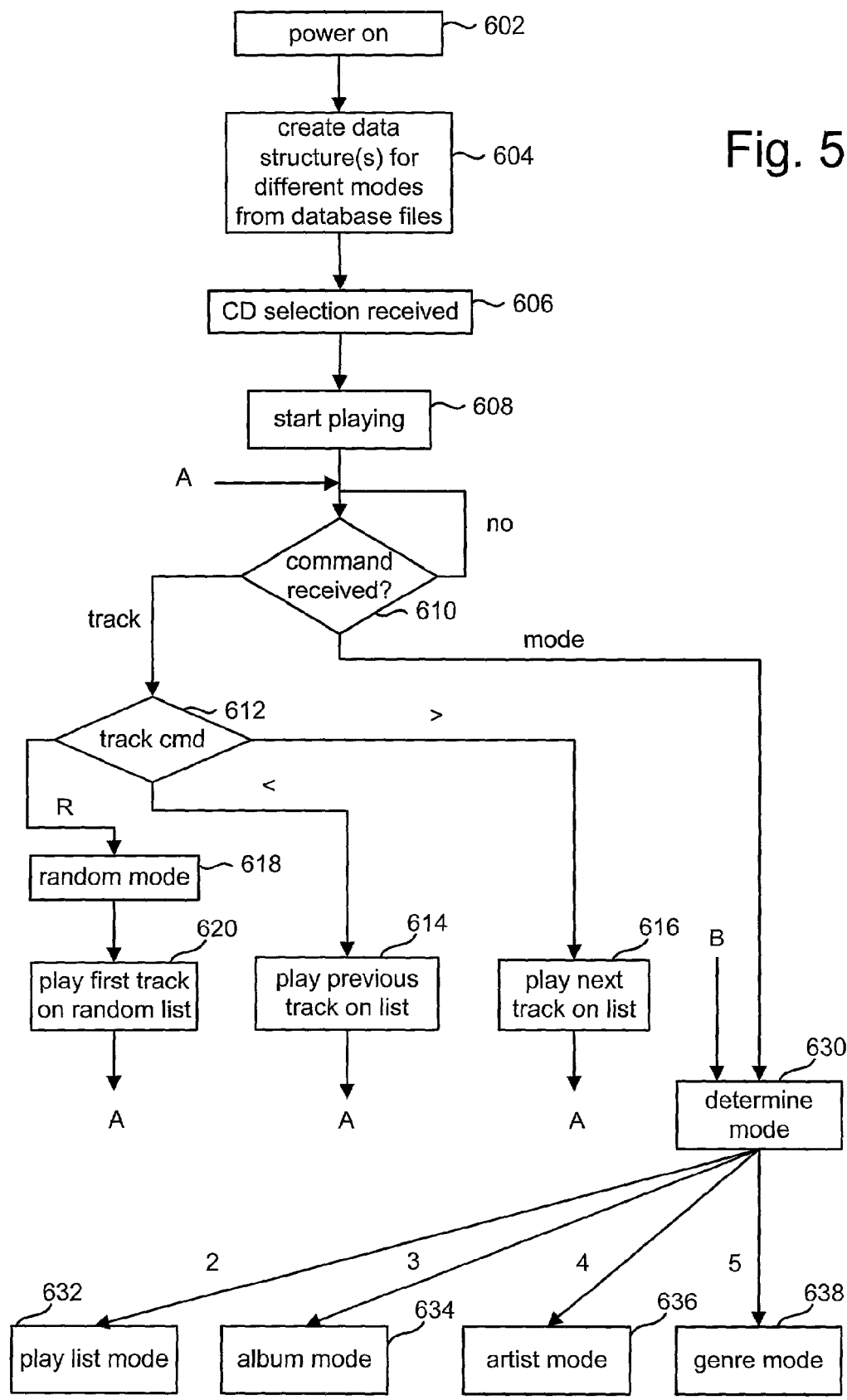
FIG. 5 is a flow chart describing an exemplar process for performing the present invention.
Figure 6:
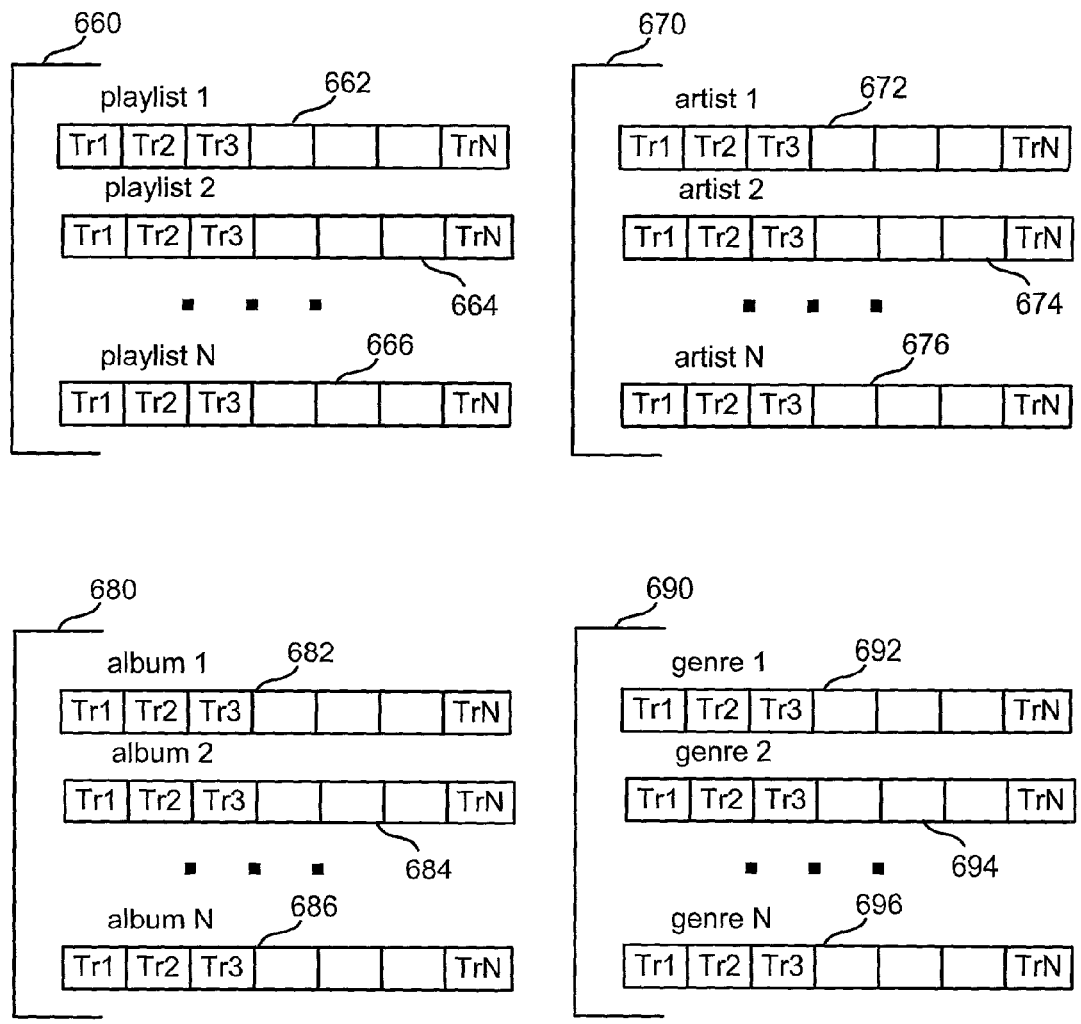
FIG. 6 depicts exemplar data structures for storing playlists according to the present invention.

FIG. 5 is a flowchart describing one embodiment of a process for performing the present invention. In step 602, audio/visual server 102 receives power. In one embodiment, upon receiving power, the system will create a set of data structures. There will be one data structure for each mode. In the embodiment where there is a mode for each track identification attribute, then there will be one data structure for each track identification attribute. In one alternative, there will be only one data structure, which will store information for each mode. The data structures will store information for playlists. In one embodiment, each mode will be associated with a track identification attribute (e.g. album, title, genre, etc.). Each mode will include a set of playlists. Each playlist will be associated with a different value for the associated track identification attribute. Within each playlist, each track in the playlist will have the same value for the track identification attribute under consideration. For example, for artist mode, there may be ten playlists representing each of the ten artists whose songs are stored on the audio/visual server. The track identification attribute associated with the mode is "artist" and each playlist will have a different value for the artist attribute. Within each playlist, every track will be by the same artist; therefore, the value for the artist attribute will be the same for each track in the playlist. FIG. 6 graphically depicts examples of the various data structures created in step 604 of FIG. 5. Data structure 660 stores the user created playlists. Data structure 670 stores the playlists for artist mode. Data structure 680 stores the playlists for album mode. Data structure 690 stores the playlists for genre mode. In one embodiment, each of the data structures of FIG. 6 are arrays. In another embodiment, the data structures are linked lists. Other types of data structures can also be used.

Data structure 660 shows playlist 662, playlist 664, . . . playlist 666. Each playlist includes a set of tracks (Tr1, Tr2, Tr3 . . . TrN). For each track, the data structure stores the track name and a path to that track on the hard disc. In some embodiments, all or a subset of the track identification attributes are stored. In one embodiment, the tracks for all the playlists of FIG. 6 are stored in a set order and played back in that order. In other embodiments, the playlists can be unordered.

Data structure 670 stores playlist 672, playlist 674, . . . playlist 676. Each playlist includes a set of tracks (Tr1, Tr2, Tr3 . . . TrN). For each track, the data structure stores the track name and a path to the track. In some embodiments, all or a subset of the track identification attributes are stored.

Data structure 680 stores the playlists for album mode. Data structure 680 can store N playlists. FIG. 6 shows playlist 682, playlist 684, . . . playlist 686. Each playlist includes a set of tracks (Tr1, Tr2, Tr3 . . . TrN).). For each track, the data structure stores the track name and a path to the track. In some embodiments, all or a subset of track identification attributes are stored. In other embodiments, other information can be stored for each track.

Data structure 690 stores the playlists for genre mode. Up to N playlists can be stored. FIG. 6 shows playlist 692, genre playlist 694, . . . genre playlist 696. Each playlist includes a set of tracks (Tr1, Tr2, Tr3 . . . TrN). For each track, the data structure stores the name and path for the track. In some embodiments, all or a subset of the track identification attributes are stored.

Upon starting, the audio/visual server will create multiple sets of playlists. Thus, the system will organize all tracks by album, artist, genre and/or other attributes. There will be one set of playlists for each mode. That is, if the user enters artist mode, the user can browse between the various artist playlists. As explained above, there will be one artist playlist for each artist represented by the music stored on the hard disc. Once the user chooses a playlist, the user will have the songs from that playlist played back to the user. The user can use the forward and reverse buttons to browse through the playlists.

Figure 7:
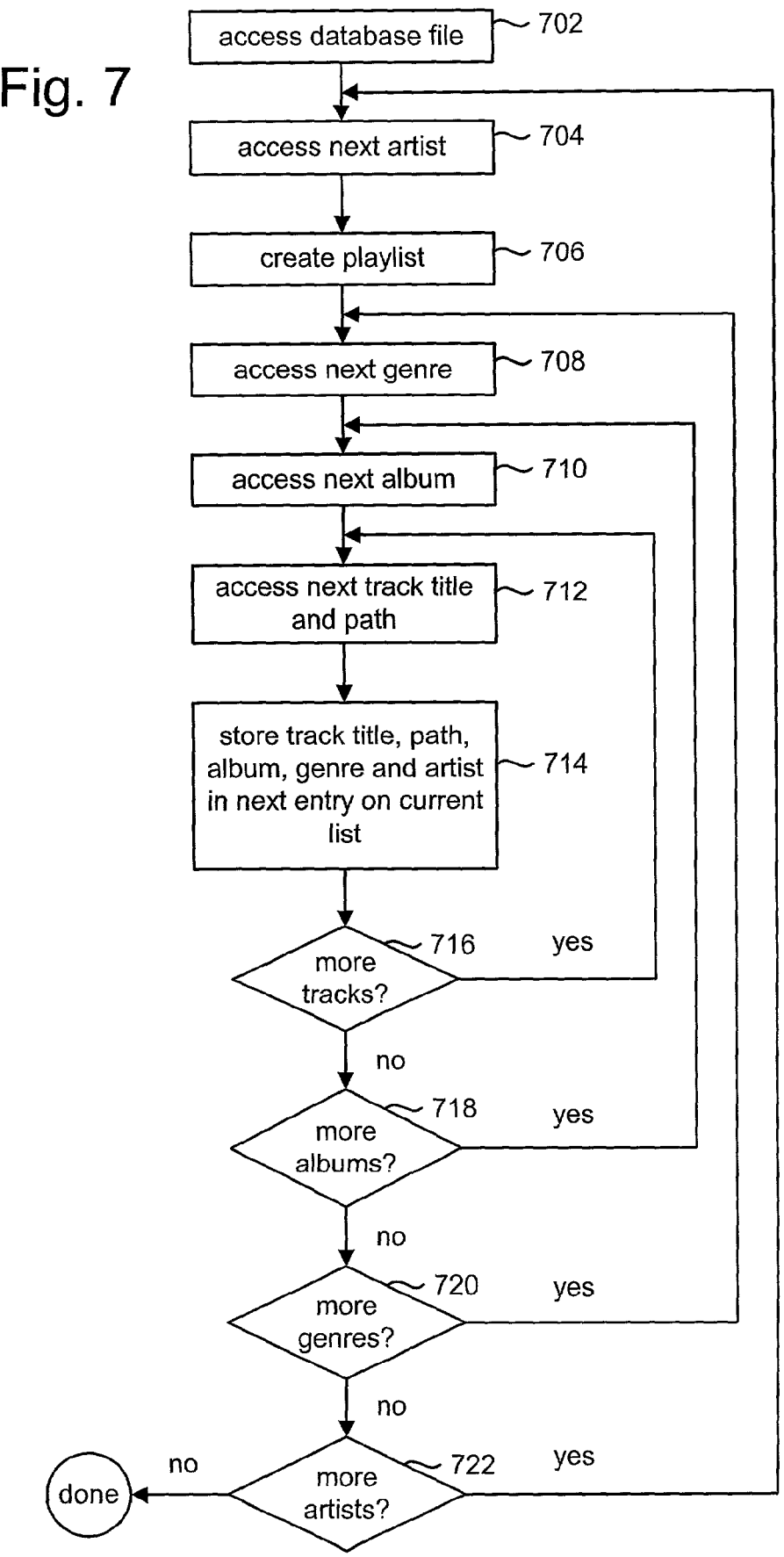
FIG. 7 is s flow chart describing an exemplar process for creating the data structures of FIG. 6.

FIG. 7 is a flowchart describing the process of creating the data structures of FIG. 6. Thus, the process of FIG. 7 implements step 604 of FIG. 5. Specifically, for example purposes, FIG. 7 describes a process for creating data structure 670. The same process can also be used to create the other data structures.

In step 702, the system accesses a database file. That is, the hard disk drive seated in the audio/visual server includes a number of database files which are added to the hard disk drive by computer 124 prior to removing disk cartridge 120 from docking station 122. In one embodiment, there is a database file for artists, a database file for genre and a database file for album. In some embodiments, there will be one database file for each mode. Alternatively, it can be thought of as one database file for each track identification attribute, which is used to create a mode.

In the artist database file, all tracks are first sorted by artist, then genre, then album, and then title. Stored with each title is the path on the hard drive for that particular title. In other words, the database file is broken up by artist. Within each artist, there is a category for each genre. Within each genre, there is a category for each album. Within each album, there is a list of titles.

The genre database file is first sorted by genre. Within each genre is a list of artists. Within each artist is a list of albums. For each album there is a list of tracks with associated paths.

The album database file is first sorted by album. Within each album is a list of genres. Within each genre is a list of artists. Within each artist is a list of titles with associated paths. The above discussion describes one exemplar set of orderings for the artist database file, genre database file and the album database file. Other orderings can also be used with the present invention. No one particular ordering is necessary for taking advantage of the present invention.

Step 702 of FIG. 7 includes the system reading the artist (or other appropriate) database file. In step 704, the next artist in the database file is accessed. If this is the first time that step 704 is performed, then the first artist is accessed. In step 706, an array is created for the artist. The array represents the playlist. For example, step 706 could include creating playlist 672 for artist 1. In step 708, the next genre listed underneath that artist is accessed. Remember that for each artist there is a list of genres. The next genre is accessed in step 708. If this is the first time that step 708 is being performed for that artist, then the first genre is accessed. In step 710, the next album is accessed. Within each genre, a list of albums is provided. The next album is chosen in step 710. If this is the first time that step 710 is being performed for this genre and artist, then the first album is selected. Within each album, there is a list of track titles and associated paths. In step 712, the next (which could be the first) title and associated path is accessed. In step 714, the track title, path, album, genre and artist for the accessed track are stored in the next available entry in the array in step 714. In other embodiments, only the track title and path is stored. In some embodiments, different information can be stored. In step 716, it is determined whether there are any more tracks for the current album being accessed. If there are more tracks, then the method loops back to step 712. If there are no more tracks for the current album, then the method loops to step 718. In step 718, it is determined whether there are any more albums for the current genre under consideration. If there are more albums, the method loops back to step 710. If there are no more albums to consider for the current genre, then the method loops to step 720 and determines whether there are any more genres to consider for the current artist. If there are more genres to consider, then the method loops back to step 708. If there are no more genres to consider for the current artist, the method loops to step 722. In step 722, it is determined whether there are any more artists to consider for the current database file. If there are more artists to consider, then the method loops back to step 704. If there are no more artists to consider, then the method of FIG. 7 is completed. FIG. 7 is performed for each of the database files to create data structures for each of the track identification attributes associated with the artist mode, album mode, genre mode and any other modes desired. However, for different database files, the order of searching artists, albums, genres and other attributes will depend on the sorting in the database file.

Looking back on FIG. 5, each of the data structures of FIG. 6 are created in step 604. After 604, the system goes into normal operation mode which includes the system being used as a radio, tape player, CD player, digital music player, etc. In step 606, the system receives a selection to play a CD. In one embodiment, step 606 includes button 512 being selected. One embodiment of the present invention includes using music server 102 to emulate a disc changer when button 512 is selected. Thus, by the user pressing CD button 512, music server 102 will be activated to emulate a disc changer and play compressed digital music files. In step 608 of FIG. 5, music server 102 begins playing music. In one embodiment, music server 102 will begin playing music at the point where it left off. When music server 102 was shut off, it was previously playing a track at a particular location in that track. Music server will start off by continuing to play that track from the location where it stopped.

In step 610 of FIG. 5, a command is received. Typically, a command will be received after a user invokes one of the control devices (e.g. buttons, knobs, sliders, etc.) shown in FIG. 4. Alternatively, a remote control or other interface can be used to send commands. Upon the user's invoking one of the buttons, knobs, sliders, etc., a command is sent to music server 102. Until a command is sent, music server 102 will continue playing music according to the current playlist and will wait for a command. There are at least two types of commands that can be received: track commands and mode commands. If a track command is received, it is determined which type of track command was received (step 612). If the user invoked the reverse button 516, then the system will play the previous track on the current playlist in step 614. If the music server was in the middle of a song, then playing the previous track can include going back to the beginning of the current track. If the music server was already at the beginning of a track, then playing the previous track includes playing the previous track on the playlist. Alternatively, playing the previous track would always mean playing the previous track on the playlist. If the command received was a forward command (in response to forward button 518), then music server 102 will play the next track on the current playlist in step 616. If the command received was a random command (in response to random button 514), then music server 102 will go into random mode in step 618 and play the first track on the randomized playlist in step 620. After steps 614, 616, or 620, the method loops back to step 610 and waits for the next command while playing the current track.

If the command received in step 610 is a mode command, then the system determines which mode command was received in step 630. If the playlist mode command was received (e.g. button 522), then the system enters the playlist mode in step 632. If the album mode command was received (e.g. button 524), then the system enters the album mode in step 634. If the artist mode command is received (e.g. button 526), then the system enters the artist mode in step 636. If the genre mode command is received (e.g. button 528), then the system enters the genre mode in step 638. In one embodiment, if the system is already in track mode and button 520 is pressed, no action will be taken.

Figure 8:
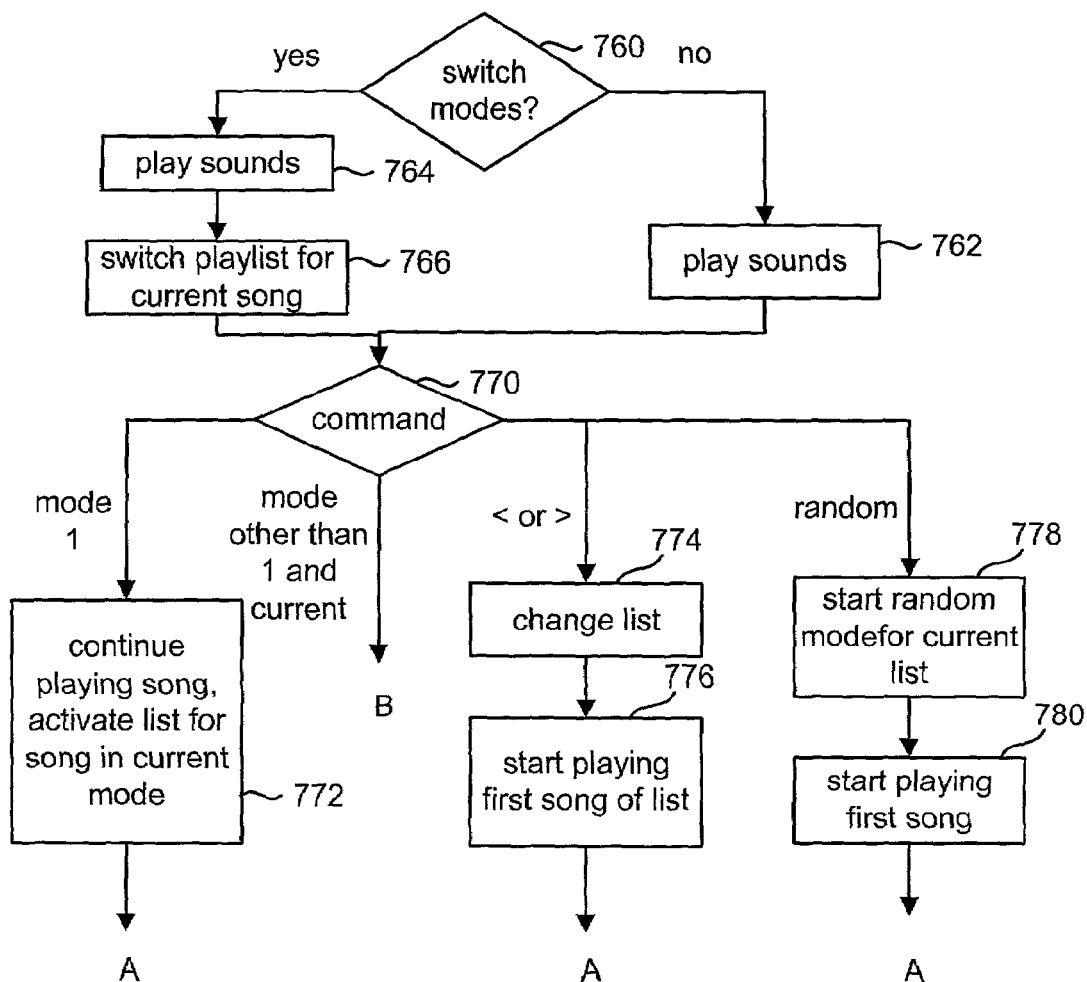
FIG. 8 is a flow chart describing an exemplar process performed when the system receives a request to operate in a particular mode.

FIG. 8 is a flowchart describing a process for performing any one of the modes. That is, the process of FIG. 8 can be used to perform playlist mode 632, album mode 634, artist mode 636, and genre mode 638, or other modes. In step 760, the system determines whether it is switching modes. For example, if the system was already in album mode and user selects button 524 for album mode, then the system is not switching modes and will play a first set of sounds in step 762. One implementation of step 762 may include audibly announcing the current playlist being used. If, in step 760, it is determined that the system is switching modes (e.g. switching from album mode to artist mode) then the systems plays sounds in step 764. In one embodiment, step 764 includes announcing the new mode and announcing the new current playlist. In addition, a time-out message can be played. The table below lists the exemplar system sounds including voices (sounds) that are played when certain events take place. In one embodiment, the sounds are based on playing sound files. In another embodiment, the sounds are based on text files and the system synthesizes sound based on the text in the files. In the table below, the current display column is the disc number displayed on the head unit at any given moment. From that point, there is a button press event, which may be any one of the numbered buttons (e.g. buttons 520-530) the reverse button 516, forward button 518 or another button. In the "Button Press" column of the table below, "t" is used to indicate that either reverse button 516 or forward button 518 are pressed. Note that in one embodiment the time-out messages have a few seconds of silence before the voice is heard; therefore, they are played immediately and stopped if a button is pushed. Additionally, certain sounds marked by $^{SW}$ can be turned on or off via the feature mode.

| Current Display | Button Press | Switch mode? | Sequence | Description |
|---|---|---|---|---|
| 1 | 2 | n | 1 | beep1 |
|   |   |   | 2 | "The current playlist is"$^{SW}$ |
|   |   |   | 3 | <playlist> |
|   |   |   | timeout | "Press the forward or reverse buttons to change the current playlist. Press 1 to begin playing" |
| 1 | 2 | y | 1 | beep2 |
|   |   |   | 2 | "Now browsing playlists"$^{SW}$ |
|   |   |   | 3 | "The current playlist is"$^{SW}$ |
|   |   |   | 4 | <playlist> |
|   |   |   | timeout | "Press the forward or reverse buttons to change the current playlist. Press 1 to begin playing" |
| 1 | 3 | n | 1 | beep1 |
|   |   |   | 2 | "The current album is"$^{SW}$ |
|   |   |   | 3 | <album> |
|   |   |   | timeout | "Press the forward or reverse buttons to change the current album. Press 1 to begin playing" |
| 1 | 3 | y | 1 | beep2 |
|   |   |   | 2 | "Now browsing albums"$^{SW}$ |
|   |   |   | 3 | "The current album is"$^{SW}$ |
|   |   |   | 4 | <album> |
|   |   |   | timeout | "Press the forward or reverse buttons to change the current album. Press 1 to begin playing" |
| 1 | 4 | n | 1 | beep1 |
|   |   |   | 2 | "The current artist is"$^{SW}$ |
|   |   |   | 3 | <artist> |
|   |   |   | timeout | "Press the forward or reverse buttons to change the current artist. Press 1 to begin playing" |
| 1 | 4 | y | 1 | beep2 |
|   |   |   | 2 | "Now browsing artists"$^{SW}$ |
|   |   |   | 3 | "The current artist is"$^{SW}$ |
|   |   |   | 4 | <artist> |
|   |   |   | timeout | "Press the forward or reverse buttons to change the current artist. Press 1 to begin playing" |
| 1 | 5 | n | 1 | beep1 |
|   |   |   | 2 | "The current genre is"$^{SW}$ |
|   |   |   | 3 | <genre> |
|   |   |   | timeout | "Press the forward or reverse buttons to change the current genre. Press 1 to begin playing" |
| 1 | 5 | y | 1 | beep2 |
|   |   |   | 2 | "Now browsing genres"$^{SW}$ |
|   |   |   | 3 | "The current genre is"$^{SW}$ |
|   |   |   | 4 | <artist> |
|   |   |   | timeout | "Press the forward or reverse buttons to change the current genre. Press 1 to begin playing" |
| 1 | 6 | n |   |   |
| 1 | 6 | n |   |   |
| 1 | t | n |   |   |
| 2 | 1 | n |   |   |
| 2 | 3 | y |   | same as 1-3-y sequence |
| 2 | 4 | y |   | same as 1-4-y sequence |
| 2 | 5 | y |   | same as 1-5-y sequence |
| 2 | 6 | n |   |   |
| 2 | t | n | 1 | <playlist> |
|   |   |   | 2 | <beginplay> |
| 3 | 1 | n |   |   |
| 3 | 2 | y |   | same as 1-2-y sequence |
| 3 | 4 | y |   | same as 1-4-y sequence |
| 3 | 5 | y |   | same as 1-5-y sequence |
| 3 | 6 | n |   |   |
| 3 | t | n | 1 | <album> |
|   |   |   | 2 | <beginplay> |
| 4 | 1 | n |   |   |
| 4 | 2 | y |   | same as 1-2-y sequence |
| 4 | 3 | y |   | same as 1-3-y sequence |
| 4 | 5 | y |   | same as 1-5-y sequence |
| 4 | 6 | n |   |   |

-continued

| Current Display | Button Press | Switch mode? | Sequence | Description |
|---|---|---|---|---|
| 4 | t | n | 1 | <artist> |
|   |   |   | 2 | <beginplay> |
| 5 | 1 | n |   |   |
| 5 | 2 | y | same as 1-2-y sequence |   |
| 5 | 3 | y | same as 1-3-y sequence |   |
| 5 | 4 | y | same as 1-4-y sequence |   |
| 5 | 6 | n |   |   |
| 5 | t | n | 1 | <genre> |
|   |   |   | 2 | <beginplay> |

In addition to the above sounds, the system can also include sounds for the feature menu including audibly announcing the various features available, and when they are enabled or disabled. In other embodiments, the system will also include a welcome message, help messages and various error messages.

In step 766, the system switches playlists. At the time of receiving the command to switch modes, the system was playing a particular track. In step 766, the system will identify the playlist in the new mode that includes the track currently being played. That identified playlist will become the new current playlist. The current track being played will continue to be played.

Figure 9:
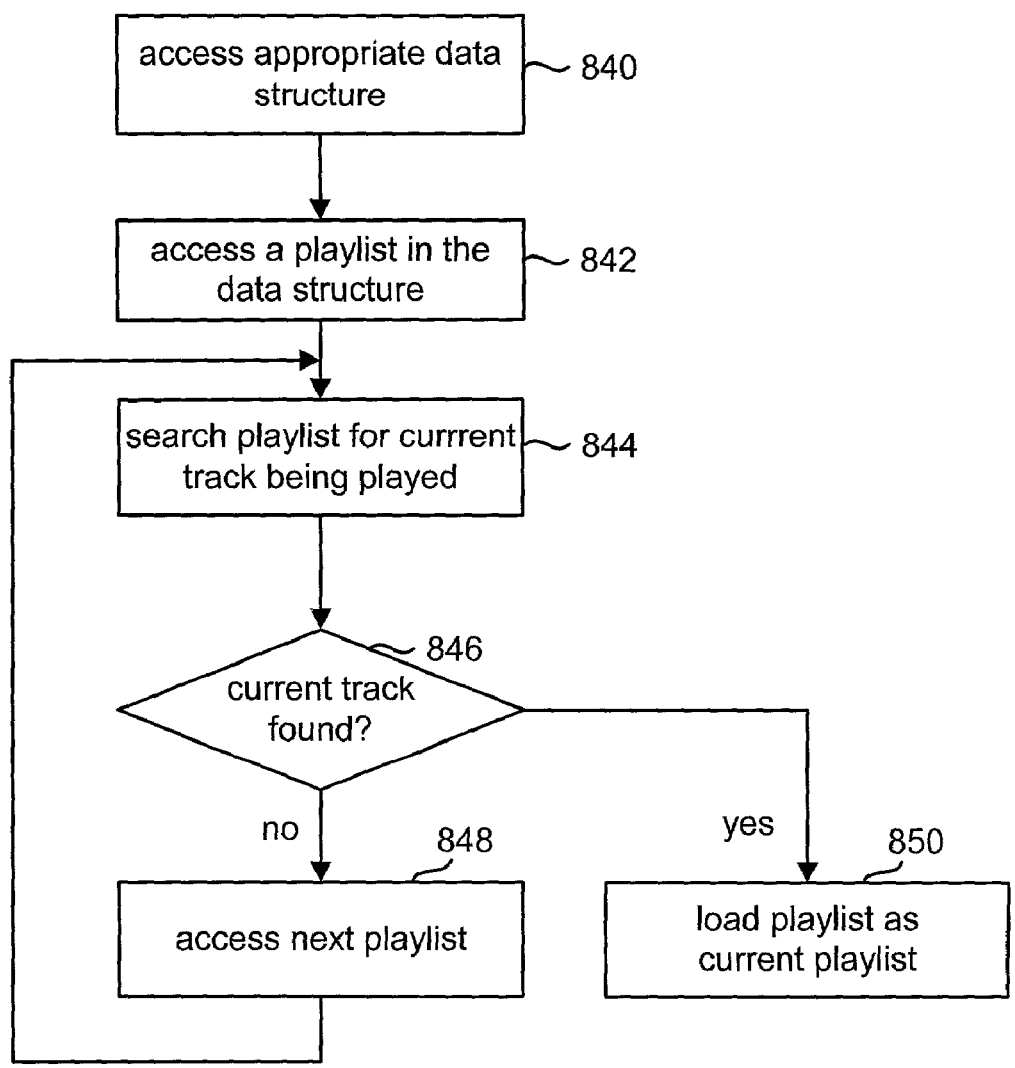
FIG. 9 is a flow chart describing one exemplar embodiment for switching a playlist.

FIG. 9 is a flow chart describing one exemplar embodiment for implementing step 766, switching the playlist. Other suitable methods can also be used. To accomplish the switching of the playlist, the system will first access the appropriate data structure in step 840. If the system is switching into user created playlist mode, then data structure 660 will be accessed. If the system is switching into artist mode, then data structure 670 will be accessed. If the system is switching into album mode, then data structure 680 will be accessed. If the system is switching into genre mode, then data structure 690 will be accessed. After accessing the appropriate data structure, the system will search the playlists of the appropriate data structure accessed in step 842 in order to identify the playlist that includes the current track being played. Thus, in step 842 one of the playlist of the appropriate data structure will be accessed. In step 844, that playlist will be searched to determine whether the current track being played is on the playlist. If the current track being played is not in the playlist being searched (step 846), then another playlist of the appropriate data structure is accessed in step 848 and the method loops back to step 844 to search that playlist. If the current track being played is in the playlist being searched (step 846), then the playlist being searched becomes the current playlist in step 850. The current track being played will continue to be played and the next track on the newly loaded current playlist will be the next track played.

Consider the example where the system is in artist mode and playing all songs by the Beatles. Assume that at the time the system was playing the song "Yesterday," the system received a command to go into album mode. At step 766, the system would look for the album that has the song "Yesterday" on it. The system would find the playlist in the album data structure 680 for the album that includes the song "Yesterday." In this example, there is an album called "Help" which has 14 tracks. The playlist for the album "Help" includes the song "Yesterday" as track 13 and "Dizzy Miss Lizzie" as track 14. The system would then load the playlist for the album "Help" and that playlist would be the new current playlist. The song "Help" will continue to be played. After the song "Help" has finished, the system will play the song "Dizzy Miss Lizzie," which is the next track on the playlist. It is possible that not all of the songs from the album "Help" will be on the playlist if all of the songs are not on the hard drive.

Looking back at FIG. 8, after steps 762 and 766, the system waits for another command in step 770. In one embodiment, it is anticipated that one of four types of commands can be received. The first type of command that can be received is the user pressing button 520 to put the system back into track mode. If such a command is received, then the system continues playing the current song and activates the playlist for that song in the current mode in step 772. After step 772, the system continues at step 610 of FIG. 5.

If the command received in step 770 is a mode button (e.g. buttons 522-530), other than the mode button 520 and other than the current mode, the system will change modes by continuing with the process of FIG. 5 at step 630.

If the command received in step 770 is the forward button 518 or reverse button 516, then the current playlist is changed by going forward one playlist or reverse one playlist depending upon which button was pushed. In step 776, the system begins playing the first song of the new playlist. After step 776, the system continues at step 610 of FIG. 5.

If the command received in step 770 is the random button, then the play order for the current playlist will be randomized in step 778. In step 780, the system will begin playing the first song of the randomized playlists. After step 780, the system continues at step 610 of FIG. 5.

In one embodiment, the system allows seeking (e.g. holding down buttons 516 or 518) in Album, Artist, or Genre modes. Seeking will allow a user to quickly scan through items by grouping all items by the first letter of the description of the item and jumping from group to group until the seeking button is no longer depressed. The system will announce a letter of the alphabet about once a second. This letter corresponds to the first letter of the currently displayed item. Note that the display shows the first item number with the current letter. When the user lets go of button 516 or button 518, the first item with the last announced letter will play. A single press of button 516 or button 518 will advance through single items. When advancing through single items, the system will revert to announcing the item text. For example, a user can enter artist mode and the system would announce "Beatles." The user may wish to hear songs from the band "U2," and can do so by pressing and holding button 518, at which point the system will announce: "c", "d", "l", "p", "s", "u." When "u" is heard, the user can let go of button 518 and the first artist that starts with the letter U is announced. In the above example certain letters were skipped—these are letters that have no artist beginning with them.

In some embodiments, all or some of the playlists are created in advance. In other embodiments, the system does not create and store playlists in advance. Rather, playlists can be created on the fly when needed, when entering a mode, at the start of operation, when new tracks are received, or at any other suitable situation/event. In some embodiments where playlists are not created in advance, the system may function without the use of data structures like that of FIG. 6.

Some of the embodiments discussed above pertain to an audio/visual server that is in communication with a head unit, where the interface is performed using the head unit. In other embodiments, the interface can be performed on the audio/visual server, without using a separate head unit or other separate device.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for presenting audio/visual tracks, said tracks having track identification attributes, said method comprising the steps of:
    detecting activation of a first input device of a head unit connected to a content server, where the head unit is adapted to communicate with a disc changer, the first input device assigned to a first default function of the disc changer, and the content server adapted to emulate the disc changer;
    reading a mapping file to override the first default function and output an indication of a first mode;
    receiving the indication of the first mode of a set of modes, each mode is associated with a different track identification attribute, each mode includes one or more playlists of tracks, each playlist of a particular mode is based on a different value for said track identification attribute associated with said particular mode;
    receiving a first value of the track identification attribute;
    accessing a first playlist for said first mode and first value of the track identification attribute; and
    playing tracks according to said first playlist.

2. A method according to claim 1, wherein:
    said first mode includes said first playlist and a second playlist;
    said first mode is associated with a first track identification attribute;
    said first track identification attribute is an indication of genre;
    said first playlist includes tracks of a first genre; and
    said second playlist includes tracks of a second genre.

3. A method according to claim 1, wherein:
    said tracks are music tracks; and
    said music tracks are stored as compressed digital audio data.

4. A method according to claim 1, where receiving the first value of the track identification attribute comprises:
    detecting activation of a second input device of the head unit, the second input device assigned to a second default function of the disc changer; and
    reading the mapping file to override the second default function to the first value of the track identification attribute.

5. A method according to claim 1, further comprising:
    receiving a second value of the track identification attribute;
    accessing a second playlist matching the second value of the track identification attribute; and
    playing tracks according to the second playlist.

6. A method according to claim 1, wherein:
    said tracks are music tracks; and
    the first default function comprises playback of a particular disc.

7. A method according to claim 6, wherein:
    said music tracks are stored as compressed digital audio data.

8. A method according to claim 1, where a data structure is associated with the playback mode and comprises the first playlist matching the first value of the track identification attribute.

9. A method according to claim 1, wherein:
    said step of playing tracks includes reading said tracks from a removable hard disk drive.

10. A method according to claim 1, further comprising the steps of:
    audibly announcing said first mode; and
    audibly announcing said first playlist.

11. A method according to claim 10, wherein:
    said step of audibly announcing said first mode includes reading a first text file and generating speech based on said first text file.

12. A method according to claim 10, wherein:
    said step of audibly announcing said first playlist includes reading an identification for said first playlist and generating speech based on said identification.

13. A method according to claim 1, further comprising the steps of:
    audibly announcing said track identification attribute; and
    audibly announcing said first playlist.

14. A method according to claim 1, where the first default function comprises tuning a particular radio station.

15. A method according to claim 1, wherein:
    said first playlist includes tracks of a first artist.

16. A method according to claim 1, wherein:
    said first playlist includes tracks of a first genre.

17. A method according to claim 1, wherein:
    said first playlist includes tracks of a first album.

18. A method according to claim 1, wherein:
    said first playlist includes tracks designated by a user.

19. A method according to claim 1, wherein:
    said track identification attribute identifies a combination of a first artist and a first genre.

20. A method according to claim 1, wherein:
    said playlists pre-exist prior to said step of detecting activation.

21. A method according to claim 1, wherein:
    said first mode includes a first set of one or more playlists; and
    said first set of one or more playlists are created in response to said step of receiving.

22. A method according to claim 1, further comprising the steps of:
    receiving a seeking command;
    audibly indicating letters associated with groups of one or more playlists until said seeking command is no longer asserted; and
    playing tracks associated with a last audibly announced letter.

23. An audio/visual player, comprising:
    an output device;
    a processor readable storage device capable of storing a plurality of tracks having track identification attributes; and
    one or more processors in communication with said output device and said processor readable storage device, said one or more processors perform a method comprising the steps of:
        detecting activation of a first input device of a head unit connected to a content server, where the head unit is adapted to communicate with a disc changer, the first input device assigned to a first default function of the disc changer, and the content server adapted to emulate the disc changer;

reading a mapping file to override the first default function and output an indication of a first mode;
receiving the indication of the first mode of a set of modes, each mode is associated with a different track identification attribute, each mode includes one or more playlists of tracks, each playlist of a particular mode is based on a different value for said track identification attribute associated with said particular mode;
receiving a first value of the track identification attribute;
accessing a first playlist for said first mode and first value of the track identification attribute; and
playing tracks according to said first playlist.

24. An audio/visual player according to claim 23, where receiving the first value of the track identification attribute comprises:
detecting activation of a second input device of the head unit, the second input device assigned to a second default function of the disc changer; and
reading the mapping file to override the second default function to the first value of the track identification attribute.

25. An audio/visual player according to claim 23, wherein:
said tracks are music tracks; and
said music tracks are stored as compressed digital audio data.

26. An audio/visual player according to claim 23, where the method further comprises:
receiving a second value of the track identification attribute;
accessing a second playlist matching the second value of the track identification attribute; and
playing tracks according to the second playlist.

27. An audio/visual player according to claim 23, further comprising:
a removable hard disk drive in communication with said one or more processors, said step of playing tracks includes reading said tracks from said removable hard disk drive.

28. An audio/visual player according to claim 23, wherein:
said tracks are music tracks; and
the first default function comprises playback of a particular disc.

29. An audio/visual player according to claim 23, where a data structure is associated with the playback mode and comprises the first playlist matching the first value of the track identification attribute.

30. An audio/visual player according to claim 23, further comprising:
a removable hard disk drive in communication with said one or more processors, said step of playing tracks includes reading said tracks from said removable hard disk drive.

31. An audio/visual player according to claim 23, wherein said method further comprises the steps of:
audibly announcing said first mode; and
audibly announcing said first playlist.

32. An audio/visual player according to claim 31, wherein:
said step of audibly announcing said first playlist includes reading an identification for said first playlist and generating speech based on said identification.

33. An audio/visual player according to claim 23, wherein said method further comprises the steps of:
audibly announcing said track identification attribute; and
audibly announcing said first playlist.

34. An audio/visual player according to claim 33, wherein:
said step of audibly announcing said first playlist includes reading an identification for said first playlist and generating speech based on said identification.

35. An audio/visual player according to claim 23, where the first default function comprises tuning a particular radio station.

36. A processor readable storage device having processor readable code embodied on said processor readable storage device, said processor readable code for programming a processor to perform a method for presenting audio/visual tracks, said tracks have attributes, said track includes a first attribute and a second attribute, said method comprising the steps of:
detecting activation of a first input device of a head unit connected to a content server, where the head unit is adapted to communicate with a disc changer, the first input device assigned to a first default function of the disc changer, and the content server adapted to emulate the disc changer;
reading a mapping file to override the first default function and output an indication of a first mode;
receiving the indication of the first mode of a set of modes, each mode is associated with a different track identification attribute, each mode includes one or more playlists of tracks, each playlist of a particular mode is based on a different value for said track identification attribute associated with said particular mode;
receiving a first value of the track identification attribute;
accessing a first playlist for said first mode and first value of the track identification attribute; and
playing tracks according to said first playlist.

37. The processor readable storage device according to claim 36, wherein:
said tracks are music tracks; and
said music tracks are stored as compressed digital audio data.

38. The processor readable storage device according to claim 36, where receiving the first value of the track identification attribute comprises:
detecting activation of a second input device of the head unit, the second input device assigned to a second default function of the disc changer; and
reading the mapping file to override the second default function to the first value of the track identification attribute.

39. The processor readable storage device according to claim 36, wherein:
said steps of playing tracks according to a first track list and playing tracks according to a second track list include reading said tracks from a removable hard disk drive.

40. The processor readable storage device according to claim 36, wherein:
said tracks are music tracks; and
the first default function comprises playback of a particular disc.

41. The processor readable storage device according to claim 36, wherein said method further comprises the steps of:
audibly announcing said first mode.

42. A system, comprising:
a head unit comprising an interface for communicating with a disc changer;
a content server connected to the head unit through the interface, the content server adapted to emulate the disc changer and operable to:
detect activation of a first input device of the head unit, the first input device assigned to a first default function of the disc changer;

read a mapping file to override the first default function to a playback mode associated with a track identification attribute;

operate under the playback mode associated with the track identification attribute;

receive a first value of the track identification attribute;

access a first playlist matching the first value of the track identification attribute; and play content files according to tracks specified in the first playlist; and a storage device in communication with the content server, the storage device comprising the mapping file and the content files.

43. The system of claim 42, where receiving the first value of the track identification attribute comprises the content server operable to:

detect activation of a second input device of the head unit, the second input device assigned to a second default function of the disc changer; and read the mapping file to override the second default function to the first value of the track identification attribute.

44. The system of claim 42, where the content server is further operable to:

receive a second value of the track identification attribute;

access a second playlist matching the second value of the track identification attribute; and play content files according to tracks specified in the second playlist.

45. The system of claim 42, where the track identification attribute comprises one or more of a genre, artist, or album.

46. The system of claim 42, where a data structure is associated with the playback mode and comprises the first playlist matching the first value of the track identification attribute.

47. A method of controlling a content server, comprising:

detecting activation of a first input device of a head unit connected to the content server, where the head unit is adapted to communicate with a disc changer, the first input device assigned to a first default function of the disc changer, and the content server is adapted to emulate the disc changer;

reading a mapping file to override the first default function to a playback mode associated with a track identification attribute;

operating under the playback mode associated with the track identification attribute;

receiving a first value of the track identification attribute;

accessing a first playlist matching the first value of the track identification attribute; and playing content files according to tracks specified in the first playlist.

48. The method of claim 47, where receiving the first value of the track identification attribute comprises:

detecting activation of a second input device of the head unit, the second input device assigned to a second default function of the disc changer; and reading the mapping file to override the second default function to the first value of the track identification attribute.

49. The method of claim 47, further comprising:

receiving a second value of the track identification attribute;

accessing a second playlist matching the second value of the track identification attribute; and playing content files according to tracks specified in the second playlist.

50. The method of claim 47, where the track identification attribute comprises one or more of a genre, artist, or album.

51. The method of claim 47, where a data structure is associated with the playback mode and comprises the first playlist matching the first value of the track identification attribute.

52. A processor readable storage device comprising processor executable instructions embodied on said processor readable storage device for controlling a server, the processor executable instructions configured to cause the processor to:

detect activation of a first input device of a head unit connected to the content server, where the head unit is adapted to communicate with a disc changer, the first input device assigned to a first default function of the disc changer, and the content server is adapted to emulate the disc changer;

read a mapping file to override the first default function to a playback mode associated with a track identification attribute;

operate under the playback mode associated with the track identification attribute;

receive a first value of the track identification attribute;

access a first playlist matching the first value of the track identification attribute; and play content files according to tracks specified in the first playlist.

53. The computer readable medium of claim 52, where receiving the first value of the track identification attribute comprises the processor executable instructions further configured to:

detect activation of a second input device of the head unit, the second input device assigned to a second default function of the disc changer; and read the mapping file to override the second default function to the first value of the track identification attribute.

54. The computer readable medium of claim 52, where the processor executable instructions are further configured to:

receive a second value of the track identification attribute;

access a second playlist matching the second value of the track identification attribute; and play content files according to tracks specified in the second playlist.

55. The computer readable medium of claim 52, where the track identification attribute comprises one or more of a genre, artist, or album.

56. The computer readable medium of claim 52, where a data structure is associated with the playback mode and comprises the first playlist matching the first value of the track identification attribute.

* * * * *